US00RE50495E

(19) United States
(12) Reissued Patent
Leleannec et al.

(10) Patent Number: US RE50,495 E
(45) Date of Reissued Patent: Jul. 15, 2025

(54) METHOD AND A DEVICE FOR DECODING AN INTRA PREDICTED BLOCK OF A PICTURE AND CORRESPONDING CODING METHOD AND CODING DEVICE

(71) Applicant: InterDigital VC Holdings, Inc., Wilmington, DE (US)

(72) Inventors: Fabrice Leleannec, Betton (FR); Tangi Poirier, Thorigné-Fouillard (FR); Fabrice Urban, Thorigné-Fouillard (FR)

(73) Assignee: InterDigital VC Holdings, Inc., Wilmington, DE (US)

(21) Appl. No.: 17/983,237

(22) Filed: Nov. 8, 2022

Related U.S. Patent Documents

Reissue of:
(64) Patent No.: 10,834,395
Issued: Nov. 10, 2020
Appl. No.: 16/301,244
PCT Filed: Apr. 24, 2017
PCT No.: PCT/EP2017/059658
§ 371 (c)(1),
(2) Date: Nov. 13, 2018
PCT Pub. No.: WO2017/194296
PCT Pub. Date: Nov. 16, 2017

(30) Foreign Application Priority Data

May 13, 2016 (EP) ..... 16305563

(51) Int. Cl.
*H04N 19/117* (2014.01)
*H04N 19/105* (2014.01)
(Continued)

(52) U.S. Cl.
CPC ..... *H04N 19/117* (2014.11); *H04N 19/105* (2014.11); *H04N 19/132* (2014.11);
(Continued)

(58) Field of Classification Search
None
See application file for complete search history.

(56) References Cited

U.S. PATENT DOCUMENTS 10,455,249 B2 * 10/2019 Zhang ..... H04N 19/176
2011/0110427 A1 * 5/2011 Teng ..... H04N 19/61 375/E7.104

(Continued)

FOREIGN PATENT DOCUMENTS

GB 2531087 A * 4/2016 ..... H04N 19/117
WO WO-2014055020 A1 * 4/2014 ..... H04N 19/117
WO 2015179898 A1 12/2015

OTHER PUBLICATIONS

Zhang, Xingyu, et. al., "Chroma Intra Prediction Based on Inter-Channel Correlation for HEVC". IEEE Transactions on Image Processing, vol. 23, No. 1, Jan. 2014, pp. 274-286.

(Continued)

*Primary Examiner* — Robert J Hance
(74) *Attorney, Agent, or Firm* — Klintworth & Rozenblat LLP

(57) ABSTRACT

Edges of the plurality of reference blocks are adjacent to a current block of a picture. A single transform is applied to samples of each reference block. A single transform is applied to samples of the current block. A decoding method includes decoding a plurality of reference blocks, obtaining a plurality of filtered reference blocks by filtering with a deblocking filter along the edges of the plurality of decoded reference blocks, and decoding the current block by intra prediction from the plurality of filtered reference blocks. An encoding method includes encoding and reconstructing a plurality of reference blocks, obtaining a plurality of filtered reference blocks by filtering with a deblocking filter along the edges of the plurality of reconstructed reference blocks, (Continued)

and encoding the current block by intra prediction from the plurality of filtered reference blocks.

12 Claims, 13 Drawing Sheets

(51) Int. Cl.

| | |
|---|---|
| ***H04N 19/132*** | (2014.01) |
| ***H04N 19/159*** | (2014.01) |
| ***H04N 19/176*** | (2014.01) |
| ***H04N 19/186*** | (2014.01) |
| ***H04N 19/593*** | (2014.01) |
| ***H04N 19/80*** | (2014.01) |
| ***H04N 19/82*** | (2014.01) |

(52) U.S. Cl.
CPC ..... *H04N 19/159* (2014.11); *H04N 19/176* (2014.11); *H04N 19/186* (2014.11); *H04N 19/593* (2014.11); *H04N 19/80* (2014.11); *H04N 19/82* (2014.11)

(56) References Cited

U.S. PATENT DOCUMENTS

| | | | | |
|---|---|---|---|---|
| 2011/0116544 | A1* | 5/2011 | Fu | H04N 19/11 375/E7.243 |
| 2012/0287995 | A1* | 11/2012 | Budagavi | H04N 19/44 375/E7.243 |
| 2013/0022107 | A1* | 1/2013 | Van der Auwera | H04N 19/157 375/240.03 |
| 2013/0034165 | A1 | 2/2013 | Sasai et al. | |
| 2013/0101024 | A1* | 4/2013 | Van der Auwera | H04N 19/117 375/E7.125 |
| 2013/0101031 | A1* | 4/2013 | Van der Auwera | H04N 19/14 375/240.12 |
| 2013/0170562 | A1* | 7/2013 | Van der Auwera | H04N 19/117 375/240.25 |
| 2014/0321552 | A1* | 10/2014 | He | H04N 19/117 375/240.24 |
| 2015/0063452 | A1 | 3/2015 | Kim et al. | |
| 2015/0365684 | A1* | 12/2015 | Chen | H04N 19/11 375/240.13 |
| 2016/0277762 | A1* | 9/2016 | Zhang | H04N 19/593 |
| 2017/0094285 | A1* | 3/2017 | Said | H04N 19/593 |
| 2019/0182482 | A1* | 6/2019 | Vanam | H04N 19/132 |

OTHER PUBLICATIONS

International Telecommunication Union, "Block Partitioning Structure for Next Generation Video Coding". Media Tek Inc., Study Group 16—Contribution 966 R3, COM 16—C 966 R3—E, Sep. 2015, 8 pages.

An, Jicheng, et al., "Quadtree Plus Binary Tree Structure Integration with JEM Tools". Media Tek Inc., Joint Video Exploration Team (JVET) of ITU-T SG16 WP3 and ISO/IEC JTC1/SC29/WG11, JVET-B0023, Feb. 20-26, 2016, pp. 1-6.

Chen, Jianle, et. al., "Algorithm Description of Joint Exploration Test Model 2". Joint Video Exploration Team (JVET) of ITU-T SG16 WP3 and ISO/IEC JTC1/SC29/WG11, JVET-B1001-v3, Feb. 20-26, 2016, 32 pages.

International Telecommunication Union, "High Efficiency Video Coding". Series H: Audiovisual and Multimedia Systems; Infrastructure of Audiovisual Services—Coding of Moving Video, Recommendation ITU-T H.265, Telecommunication Standardization Sector of ITU, Apr. 2015, 634 pages.

International Telecommunication Union, "High Efficiency Video Coding". Series H: Audiovisual and Multimedia Systems; Infrastructure of Audiovisual Services—Coding of Moving Video, Recommendation ITU-T H.265, Telecommunication Standardization Sector of ITU, Oct. 2014, 540 pages.

International Telecommunication Union, "Advanced Video Coding for Generic Audiovisual Services". Series H: Audiovisual and Multimedia Systems; Infrastructure of Audiovisual Services—Coding of Moving Video, Recommendation ITU-T H.264, Telecommunication Standardization Sector of ITU, Mar. 2009, 670 pages.

Chen, Jianle, et al., "CE6.a: Chroma Intra Prediction by Reconstructed Luma Samples". Joint Collaborative Team on Video Coding (JCT-VC) of ITU-T SG16 WP3 and ISO/IEC JTC1/SC29/WG11, JCTVC-E266, Mar. 16-23, 2011, pp. 1-7.

Sullivan, Gary J., et. al., "Overview of the High Efficiency Video Coding (HEVC) Standard". IEEE Transactions on Circuits and Systems for Video Technology, vol. 22, No. 12, Dec. 2012, pp. 1649-1668.

Lee, Sang Heon, et. al., "Intra Prediction Method Based on the Linear Relationship Between the Channels for YUV 4 : 2 : 0 Intra Coding". IEEE International Conference on Image Processing (ICIP), Nov. 7, 2009, pp. 1037-1040.

International Search Report and Written Opinion on Patentability for PCT/EP2017/059658 mailed Aug. 8, 2017, 17 pages.

International Preliminary Report on Patentability for PCT/EP2017/059658 issued on Nov. 13, 2019, 10 pages.

Zhang et al., "Chroma Intra Prediction Based on Inter-Channel Correlation for HEVC", IEEE Transactions on Image Processing, vol. 23, No. 1, Jan. 2014, pp. 274-286.

Anonymous, "Block Partitioning Structure for Next Generation Video Coding", International Telecommunication Union, Telecommunication Standardization Sector, Document COM—C 966 R3—E, Sep. 2015, pp. 1-8.

An et al., "Quadtree plus binary tree structure integration with JEM tools", Joint Video Exploration Team of ITU-T SG 16 WP 3 and ISO/IEC JTC 1/SC 29/WG 11, Document JVET-B0023, San Diego, California, USA, Feb. 20, 2016, pp. 1-6.

Chen et al., "Algorithm Description of Joint Exploration Test Model 2", Joint Video Exploration Team of ITU-T SG 16 WP 3 and ISO/IEC JTC 1/SC 29/WG 11, Document JVET-B1001 v3, San Diego, California, USA, Feb. 20, 2016, pp. 1-32.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2015, pp. 1-634.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommmendation ITU-T H.265, Oct. 2014, pp. 1-540.

Anonymous, "Advanced video coding for generic audiovisual services", International Telecommunication Union, ITU-T Telecommunication Standardization Sector of ITU, Series H: Audiovisual and Multimedia Systems, Infrastructure of audiovisual services—Coding of moving video, Recommendation ITU-T H.264, Mar. 2009, pp. 1-670.

Chen et al., "CE6.a.4: Chroma intra prediction by reconstructed luma samples", Joint Collaborative Team on Video Coding (JCT-VC) of ITU-T SG 16 WP 3 and ISO/IEC JTC 1/SC 29/WG 11, Document JCTVC-E266, Geneva, Switzerland, Mar. 16, 2011, pp. 1-7.

Sullivan et al., "Overview of the High Efficiency Coding (HEVC) Standard", IEEE Transactions on Circuits and Systems for Video Technology, vol. 22, No. 12, Dec. 2012, pp. 1649-1668.

Lee et al., "Intra Prediction Method Based on the Linear Relationship Between the Channels for YUV 4:2:0 Intra Coding", 16th IEEE International Conference on Image Processing (ICIP), Cairo, Egypt, Nov. 7, 2009, pp. 1037-1040.

* cited by examiner

METHOD AND A DEVICE FOR DECODING AN INTRA PREDICTED BLOCK OF A PICTURE AND CORRESPONDING CODING METHOD AND CODING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application [claims the benefit,] *is a broadening reissue of U.S. Pat. No. 10,834,395, issued on Nov. 10, 2020, having application Ser. No. 16/301,244, filed Nov. 13, 2018, which is a national stage application* under 35 U.S.C. § [365] of International Application PCT/EP2017/059658, filed Apr. 24, 2017, which was published in accordance with PCT Article 21(2) on Nov. 16, 2017, in English, and which claims the benefit of European Patent Application No. 16305563.5, filed May 13, 2016.

1. TECHNICAL FIELD

In the following, a method and a device for encoding an intra predicted block of a picture are disclosed. Corresponding decoding method and decoding device are further disclosed.

2. BACKGROUND ART

State of the art methods for coding a current block of a current picture usually comprises predicting the block to obtain a predictor, determining a residual block by subtracting the predictor from the current block and encoding the residual block into a stream. The current block is predicted from one or a plurality of other block(s), called reference blocks, already coded and reconstructed. The one or the plurality of other block(s) belong(s) to the current picture (intra coding) or to another picture different from the current picture (inter coding). In the case where the current block is predicted from a plurality of reference blocks, the predictor may suffer from blocking artifacts. FIG. 1 depicts such a current block B intra predicted from a plurality of reference blocks, namely the spatially neighboring grey blocks.

State of the art methods for coding a current block of a current picture usually comprises in-loop filtering step(s). As an example, in H.265 video coding standard a filtering step using a deblocking filter is included in the coding loop. Other filtering steps may be included such as a sample adaptive offset (SAO) filtering. The H.265 deblocking filter attenuates discontinuities at prediction and transform block boundaries, i.e. the external frontiers of the blocks. However, some discontinuities remains in the picture. There is thus a need to further improve the in-loop filtering in order to increase the coding efficiency of the coding method.

3. BRIEF SUMMARY

A method for decoding a current block of a picture is disclosed that comprises:

decoding a plurality of reference blocks;

filtering with a deblocking filter along edges of said plurality of decoded reference blocks; and decoding said current block by intra prediction from said plurality of filtered reference blocks.

A decoding device is disclosed that comprises:

means for decoding a plurality of reference blocks;

means for filtering with a deblocking filter along edges of said plurality of decoded reference blocks; and means for decoding said current block by intra prediction from said plurality of filtered reference blocks.

A decoding device is disclosed that comprises a communication interface configured to access at least a stream and at least one processor configured to:

decode a plurality of reference blocks from the accessed stream;

filter with a deblocking filter along edges of said plurality of decoded reference blocks; and decode said current block from the accessed stream by intra prediction from said plurality of filtered reference blocks.

A non-transitory computer readable medium with instructions stored therein which is disclosed, upon execution, instruct at least one processor to:

decode a plurality of reference blocks;

filter with a deblocking filter along edges of said plurality of decoded reference blocks; and decode said current block by intra prediction from said plurality of filtered reference blocks.

A method for encoding a current block of a picture comprising:

encoding and reconstructing a plurality of reference blocks;

filtering with a deblocking filter along edges of said plurality of reconstructed reference blocks; and encoding said current block by intra prediction from said plurality of filtered reference blocks.

A coding device comprising:

means for encoding and for reconstructing a plurality of reference blocks;

means for filtering with a deblocking filter along edges of said plurality of reconstructed reference blocks; and means for encoding said current block by intra prediction from said plurality of filtered reference blocks.

A coding device is disclosed that comprises a communication interface configured to access a current block of a picture and at least one processor configured to:

encode and reconstruct a plurality of reference blocks in a stream;

filter with a deblocking filter along edges of said plurality of reconstructed reference blocks; and encoding the accessed current block by intra prediction from said plurality of filtered reference blocks in said stream.

A non-transitory computer readable medium with instructions stored therein Is disclosed which, upon execution, instruct at least one processor to:

encode and reconstruct a plurality of reference blocks;

filter with a deblocking filter along edges of said plurality of reconstructed reference blocks; and encoding the accessed current block by intra prediction from said plurality of filtered reference blocks.

According to a specific embodiment, each reference block is a block on which a same transform is applied and said current block is a block on which a same transform is applied.

According to a specific embodiment, said current block is a chroma block and said plurality of reference blocks is a plurality of luma blocks co-located with said chroma block.

According to a specific embodiment, said plurality of reference blocks is a plurality of blocks spatially neighboring said current block.

4. BRIEF SUMMARY OF THE DRAWINGS

5. DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

According to the present principles, a block is a square or rectangular part of a picture comprising samples associated with sample values, e.g. luma samples or chroma samples. For convenience of terminology, the terms are referred to as luma and chroma. However, the methods and devices disclosed may apply to different color representation such as for example RGB. Therefore, in all embodiment luma may be replaced by a first component and chroma by a second component.

In the following, the word "reconstructed" and "decoded" can be used interchangeably. Usually but not necessarily "reconstructed" is used on the encoder side while "decoded" is used on the decoder side.

Figure 1:
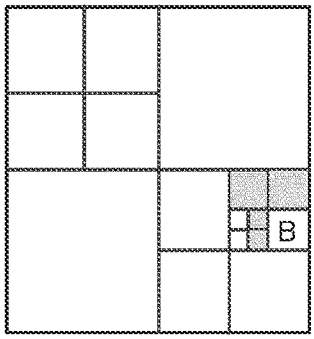
FIG. 1 depicts a current block B intra predicted from a plurality of reference blocks.
Figure 2:
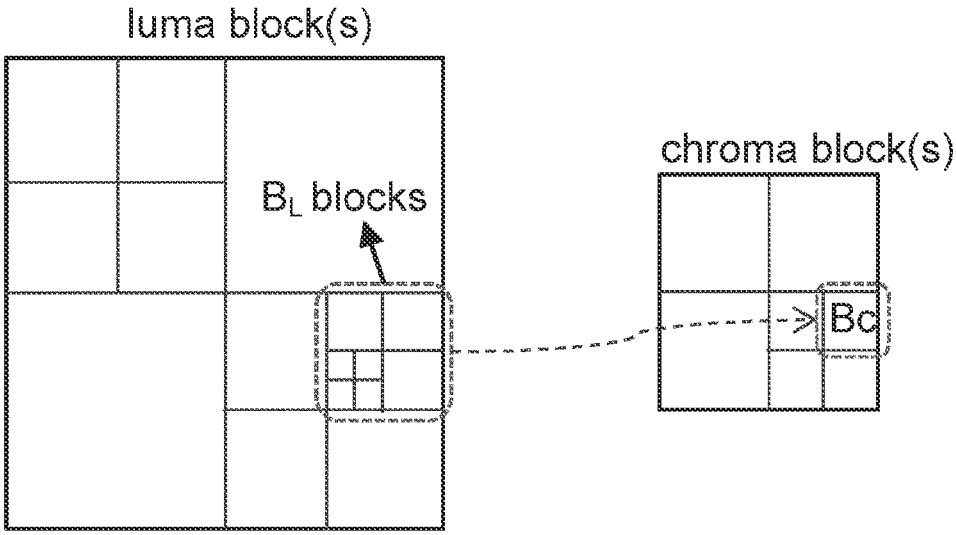
FIG. 2 represents on the left a luma component of a picture's part divided into blocks according to a quad-tree decomposition and on the right a chroma component of the same picture's part divided into blocks according to a quad-tree decomposition.

FIG. 2 represents, on the left, a luma component of a picture divided into blocks according to a first quad-tree decomposition. The FIG. 2 represents, on the right, a chroma component of the picture divided into blocks according to a second quad-tree decomposition different from the first quad-tree decomposition.

The blocks may be Transform Blocks (TB) or Prediction blocks (PB) within the meaning of H.265. A TB is a rectangular block of samples of a color component on which the same transform is applied for coding a residual signal. In the following, TB is used to designate such a block on which the same transform is applied. A PB is a rectangular block of samples of a color component on which one and the same prediction is applied. (e.g. same motion parameters for motion compensated prediction). In HEVC, a Coding Tree Block (CTB) is subdivided recursively into Coding Blocks (CBs) along a coding tree structure. A CB may then be partitioned into multiple TBs. The partitioning of a CB into TBs is carried out recursively based on a quadtree approach. In the case where a CB is not further partitioned, the CB is considered to be a TB. To each type of block (i.e. TB, PB, CB, CTB) corresponds a unit (i.e. a transform unit TU, a prediction unit PU, a coding unit CU and a coding tree unit CTU respectively). A unit comprises information related to all color components, e.g. the luma component and the two chroma components. As an example, a CTU comprises a CTB of luma samples and two corresponding CTB of chroma samples in the case of a color picture. In the same way, a CU comprises a CB of luma samples and two corresponding CB of chroma samples in the case of a color picture.

In other implementations different from H.265, the blocks may be Coding Blocks (CB) and/or Prediction Blocks (PB), in the case where a CB and/or a PB is/are defined as rectangular block(s) of samples on which the same transform is applied for coding the residual signal.

On FIG. 2, a plurality of luma blocks $B_L$ surrounded by a dashed line are co-located to the single chroma block $B_C$ also surrounded by a dashed line. Co-located means that the block $B_C$ and the blocks $B_L$ cover the same portion of the picture possibly subject to downsampling depending on the color format (4:4:4, 4:2:0, . . . ). The chroma block $B_C$ is for example a CB and each luma block $B_L$ is for example a TB, the plurality of blocks $B_L$ forming a luma CB co-located with the chroma CB. On FIG. 2, the chroma component is downsampled with respect to the luma component. It will be appreciated, however, that the present principles also apply to the case where the luma component and the chroma component(s) have the same resolution. By using different quad-tree decompositions for dividing the chroma component and the luma component, blocking artifacts may appear in the case where the chroma block $B_C$ is intra predicted from the luma component, more precisely from the co-located blocks $B_L$ of the luma component. When blocking artifacts are created in a predictor, these artifacts usually appear in the residual block derived from the predictor and thus also in the reconstructed/decoded block.

Figure 3:
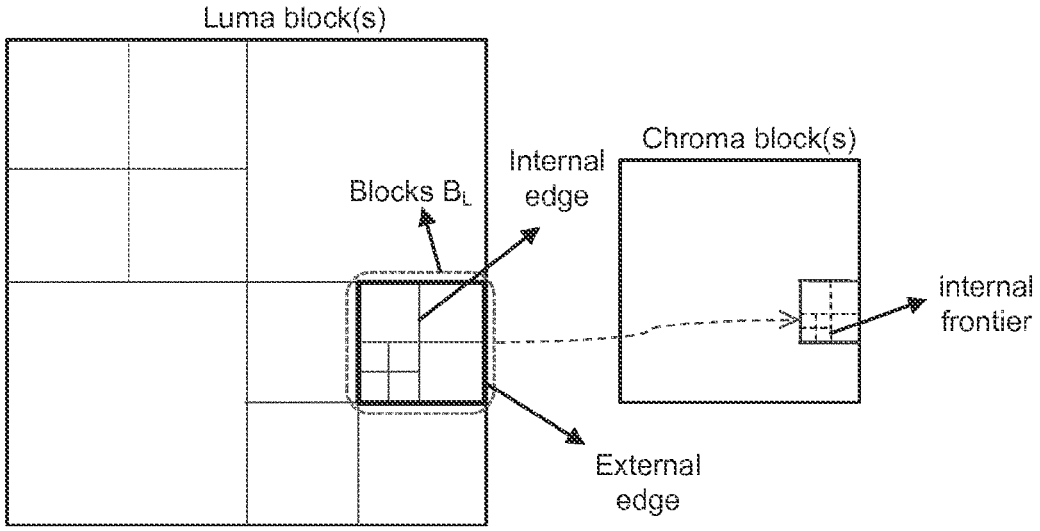
FIG. 3 shows frontiers, i.e. dividing lines, that may be created inside the reconstructed chroma block $B_C$ because of its intra prediction from a plurality luma blocks $B_L$.

FIG. 3 shows frontiers, i.e. dividing lines that may be created inside the reconstructed chroma block $B_C$ because of its intra prediction from the plurality of luma blocks $B_L$. This intra prediction mode is also named LM mode in the literature (LM stands for "Linear Mode"). This mode exploits inter-component correlation using reconstructed luma samples $rec_\gamma$ to predict chroma samples linearly with parameters $\alpha$ and $\beta$. The parameters $\alpha$ and $\beta$ may be derived from spatially neighboring reconstructed luma and chroma samples at both encoder and decoder to avoid overhead signaling. In a variant, the parameters $\alpha$ and $\beta$ may be derived from the source luma and chroma samples at encoder, coded and transmitted to a decoder.

Figure 4:
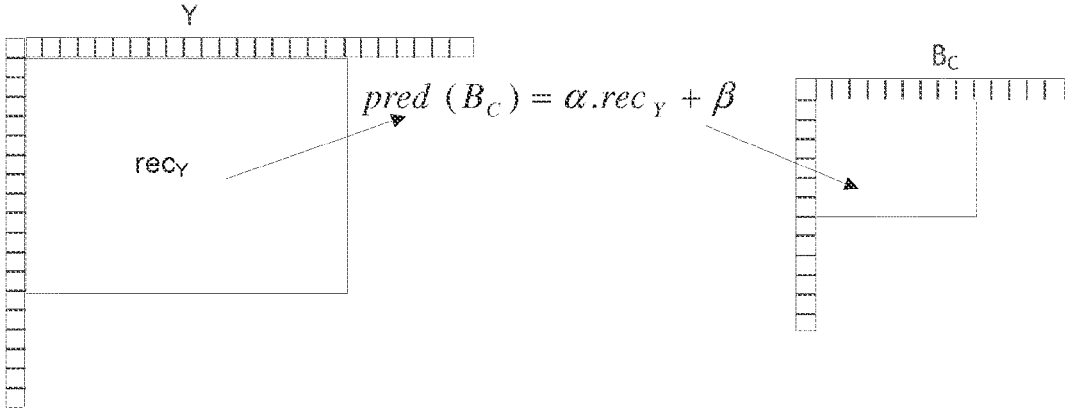
FIG. 4 illustrates the prediction of a chroma block from reconstructed luma samples.

FIG. 4 illustrates the LM mode. The chroma block $B_C$ is predicted from reconstructed luma samples $rec_\gamma$ of the blocks $B_L$.

The H.265 deblocking filter only filters the external frontier of the chroma block $B_C$ and thus does not reduce the blocking artifacts inside the chroma block $B_C$ in the case of prediction from co-located reconstructed luma samples. Indeed, the H.265 standard specifies the deblocking filter as a process that applies on the transform block or prediction block external frontiers after the picture is reconstructed/decoded.

Figure 5:
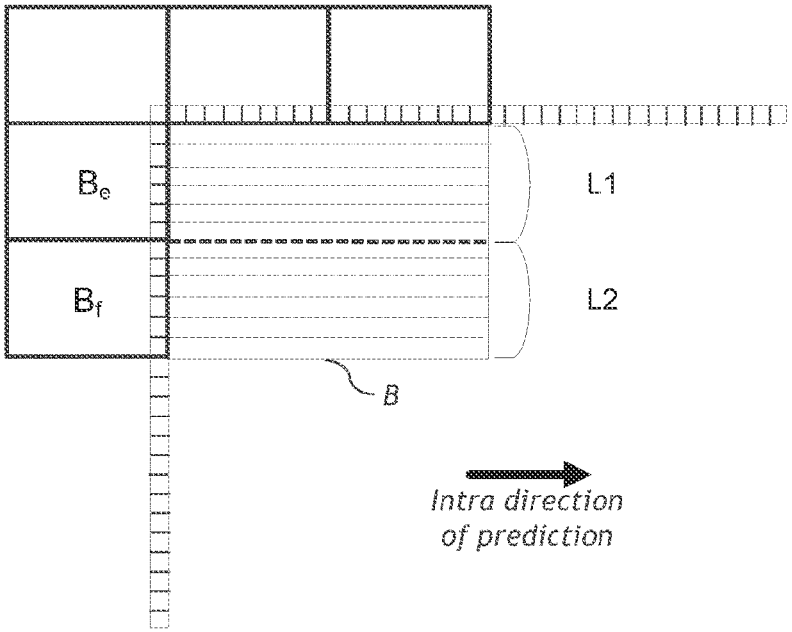
FIG. 5 depicts a block B to be intra predicted from spatially neighboring blocks Be and Bf according to a horizontal direction

FIG. 5 depicts a block B (e.g. a luma TB or a chroma TB) intra predicted from spatially neighboring blocks Be and Bf according to a horizontal direction of prediction.

State of the art video coding standards (e.g. H.264, H.265) define a spatial intra prediction mode. According to this mode, the block B is thus predicted from spatially neighboring blocks already reconstructed/decoded. The prediction is made according to a direction of prediction. In H.264 video coding standard 9 directions of prediction are defined while in H.265 33 directions of prediction are defined. The first lines (L1) of the predictor are derived from the block Be. The last lines (L2) of the predictor are derived from the block Bf. Consequently, a frontier may appear in the predictor. The frontier is represented by the dashed line on FIG. 5. In the case where, a frontier is present inside the predictor, this frontier appears also in the residual block and thus in the reconstructed/decoded block.

Figure 6:
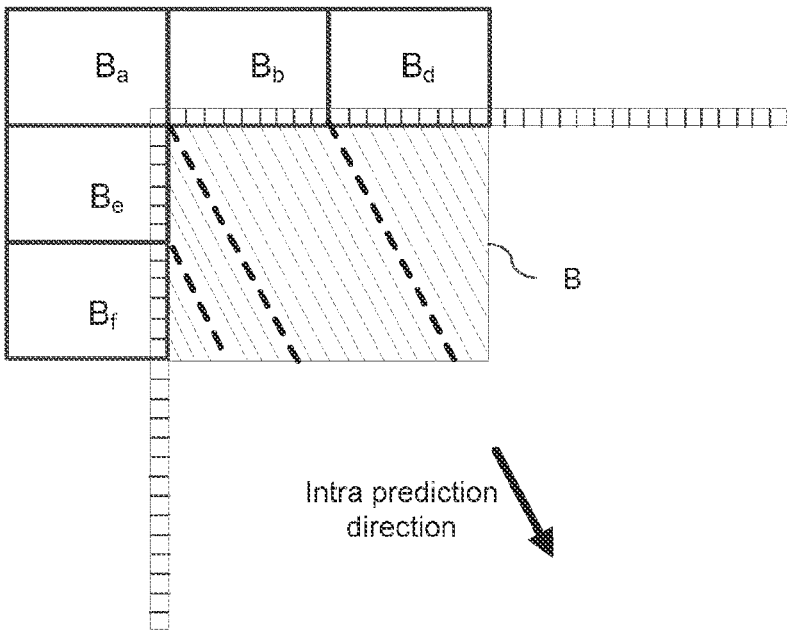
FIG. 6 depicts a block B to be intra predicted from spatially neighboring blocks Ba, Bb, Bd, Be, Bf according to an angular direction.

FIG. 6 depicts a block B (e.g. a TB) that is intra predicted from spatially neighboring blocks Ba, Bb, Bd, Be, Bf according to an angular direction. A frontier that follows the angular direction of prediction may appear in the predictor. The frontiers are represented by dashed lines on FIG. 6.

Figure 14:
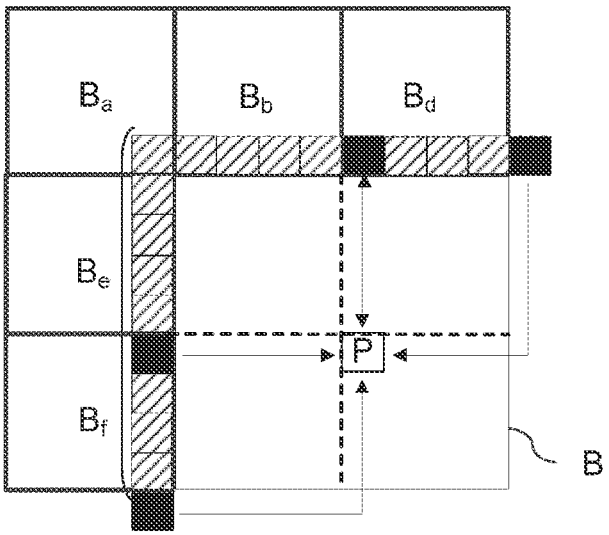
FIG. 14 depicts a block B to be intra predicted from spatially neighboring blocks Ba, Bb, Bd, Be, Bf according to a planar mode.

FIG. 14 depicts a block B (e.g. a TB) that is intra predicted from spatially neighboring blocks Ba, Bb, Bd, Be, Bf (spatially neighboring TBs) according to a planar prediction mode. The pixel P is predicted according to the planar mode by a linear combination of the 4 pixels (indicated by the 4 black squares) of the spatially neighboring blocks. A horizontal frontier and a vertical frontier may appear in the predictor. The frontiers are represented by dashed lines on FIG. 14.

The H.265 deblocking filter only filters the external frontier of the block B and thus would not reduce the blocking artifact inside the block B in the case of spatial prediction from a plurality neighboring blocks. Indeed, the H.265 deblocking filter only filters the transform block or prediction block external frontiers after the picture is reconstructed/decoded.

Figure 7:
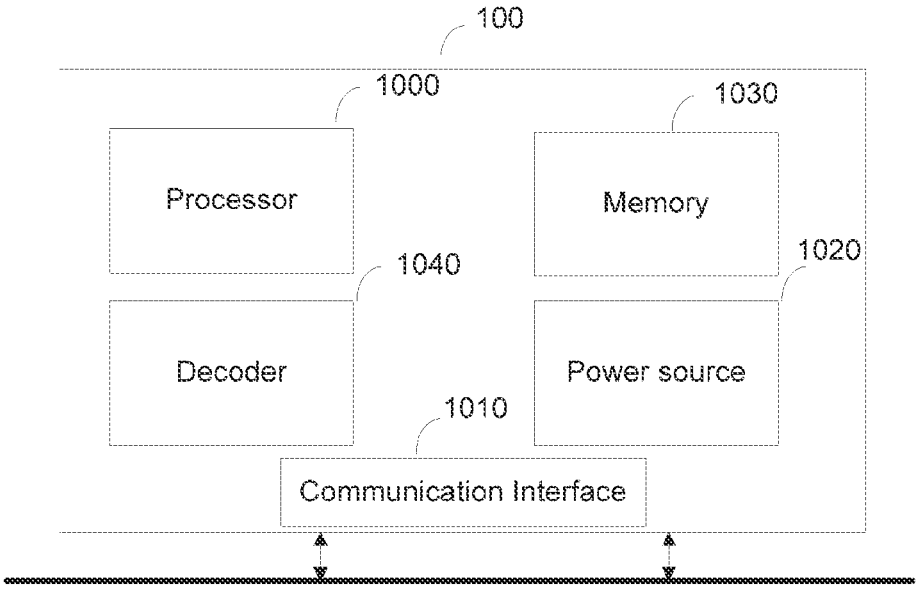
FIG. 7 represents an exemplary architecture of a receiver configured to decode a block of a picture from a stream to obtain a decoded block according to a specific and non-limiting embodiment, wherein the block is intra predicted from a plurality, i.e. at least two, of reference blocks.

FIG. 7 represents an exemplary architecture of a receiver 100 configured to decode a block of a picture from a stream to obtain a decoded block according to a specific and non-limiting embodiment, wherein the block is intra predicted from a plurality, i.e. at least two, of reference blocks.

The receiver 100 comprises one or more processor(s) 1000, which could comprise, for example, a CPU, a GPU and/or a DSP (English acronym of Digital Signal Processor), along with internal memory 1030 (e.g. RAM, ROM and/or EPROM). The receiver 100 comprises one or more communication interface(s) 1010 (e.g. a keyboard, a mouse, a touchpad, a webcam), each adapted to display output information and/or allow a user to enter commands and/or data; and a power source 1020 which may be external to the receiver 100. The receiver 100 may also comprise one or more network interface(s) (not shown). The decoder module 1040 represents the module that may be included in a device to perform the decoding functions. Additionally, the decoder module 1040 may be implemented as a separate element of the receiver 100 or may be incorporated within processor(s) 1000 as a combination of hardware and software as known to those skilled in the art.

The stream may be obtained from a source. According to different embodiments, the source can be, but is not limited to:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the decoded block may be sent to a destination, e.g. a display device. As an example, the decoded block is stored in a remote or in a local memory, e.g. a video memory or a RAM, a hard disk. In a variant, the decoded block is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 100 further comprises a computer program stored in the memory 1030. The computer program comprises instructions which, when executed by the receiver 100, in particular by the processor 1000, enable the receiver to execute the decoding method described with reference to any one of the FIGS. 8, 9A, 9B, 9C and 10. According to a variant, the computer program is stored externally to the receiver 100 on a non-transitory digital data support, e.g. on an external storage medium such as a HDD, CD-ROM, DVD, a read-only and/or DVD drive and/or a DVD Read/Write drive, all known in the art. The receiver 100 thus comprises a mechanism to read the computer program. Further, the receiver 100 could access one or more Universal Serial Bus (USB)-type storage devices (e.g., "memory sticks.") through corresponding USB ports (not shown).

According to exemplary and non-limiting embodiments, the receiver 100 can be, but is not limited to:

a mobile device;
a communication device;
a game device;
a set top box;
a TV set;
a tablet (or tablet computer);
a laptop;
a video player, e.g. a Blu-ray player, a DVD player;
a display and
a decoding chip or decoding device.

On the following FIGS. 8, 9A, 9B, 9C, 10 and 12, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 8:
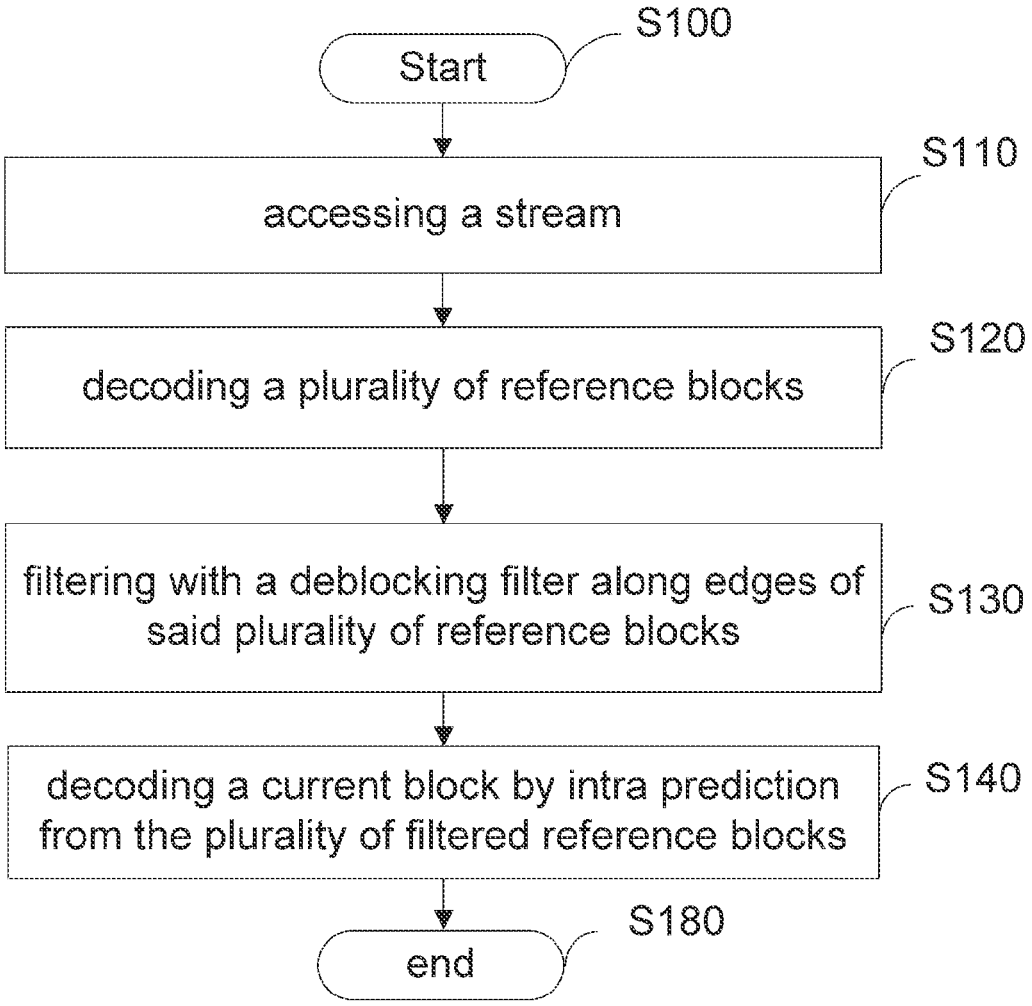
FIG. 8 represents a flowchart of a method for decoding a block of a picture from a stream to obtain a decoded block according to a specific and non-limiting embodiment, wherein the block is intra predicted from a plurality, i.e. at least two, of reference blocks.

FIG. 8 represents a flowchart of a method for decoding a block of a picture from a stream to obtain a decoded block according to a specific and non-limiting embodiment, wherein the block is intra predicted from a plurality, i.e. at least two, of reference blocks.

The method starts at step S100. At step S110, a receiver accesses a stream. At step S120, the receiver decodes a plurality of reference blocks from the stream. Decoding a reference block comprises decoding a residual block from the stream, transforming the residual block using a transform that is the inverse of the one used at encoder side and adding a predictor to the transformed block to obtain the decoded block. Decoding may further comprise, before the transforming step, inverse quantizing the residual block using a quantization parameter. As an example, each of the reference blocks is a block on which the same transform is applied, e.g. a TB.

At step S130, the receiver filters with a deblocking filter along edges of the plurality of reference blocks decoded at step S120. To this aim, the deblocking filter may be the H.265 deblocking filter defined in section 8.7.2 of the document entitled "High Efficiency Video Coding" published in April 2015. It will be appreciated, however, that the present principles also apply to a deblocking filter of the H.264 type or more generally to any deblocking filter.

A deblocking filter of the H.265 type filters an edge based on quantization parameters associated with regions apart from the edge. Such a deblocking filter makes also use of a boundary strength parameter Bs. According to the present principles, the H.265 deblocking may be adapted to also filter an edge of a reference block before it is used for prediction.

Figure 13:
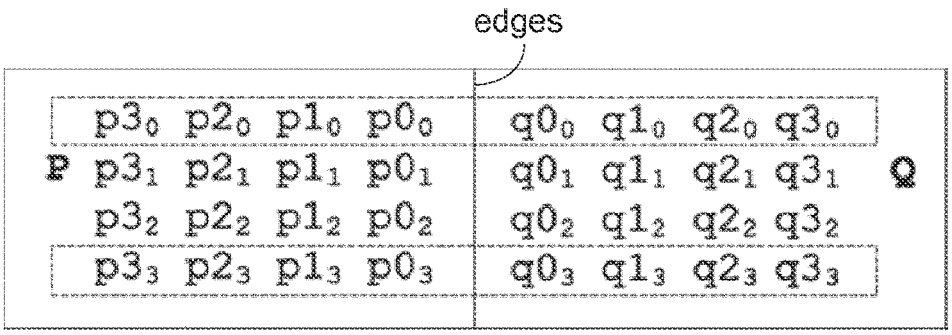
FIG. 13 depicts a frontier to be filtered inside a block.

Deblocking is thus performed on a four-sample part of an edge as depicted on FIG. 13. This figure represents an edge that delineates two parts P and Q. $p_x$ and $q_x$ represent samples. Filtering is performed on luma samples when all of the following criteria are true: 1) the boundary strength Bs is greater than zero; and 2) variation of signal on both sides of the edge is below a specified threshold:

$|p2,0-2p1,0+p0,0|+|p2,3-2p1,3+p0,3|+|q2,0-2q1,0+q0,0|+|q2,3-2q1,3+q0,3|>\beta$ (1) where threshold R depends on a quantization parameter QP and is derived from a look-up table. For edges with an associate Bs greater than zero, and for which (1) is true, deblocking filtering is performed.

In a specific embodiment, a normal deblocking filtering is applied along the edges of the plurality of reference blocks decoded at step S120.

Normal filtering has two modes differing in the number of pixels being modified on each side of the edge.

If $|p2,0-2p1,0+p0,0|+|p2,3-2p1,3+p0,3|<3/16\beta$ (5), then the two nearest samples to the edge can be modified in the left part P, otherwise only the nearest samples in P can be modified.

If $|q2,0-2q1,0+q0,0|+|q2,3-2q1,3+q0,3|<3/16\beta$ (6), then the two nearest samples to the edge can be modified in the right part Q, otherwise only the nearest samples in Q can be modified.

Normal Filtering Operations

In the normal filtering mode for a segment of four lines, filtering operations are applied for each line. In the following, the second indices of pixels, indicating the line number, are omitted for brevity.

The filtered pixel values p'0 and q'0 are calculated for each line across the edge by adding or subtracting an offset as follows:

$$p'0=p0+\Delta_0 \quad (7)$$

and $$q'0=q0-\Delta_0 \quad (8)$$

where the value of $\Delta_0$ is obtained by clipping $\delta_0$: $\Delta_0=\text{clip}(-tC,tC,\delta_0)$, where clip(a,b,c)=Max(a, Min(b,c)), tC is a clipping parameter dependent on the QP and $\delta 0=(9*(q0-p0)-3*(q1-p1)+8)>>4$ (9). tC is for example defined by a look-up table. Neglecting the clipping operation, the impulse response of this filter is (3 7 9 −3)/16.

Furthermore, the deblocking filtering is applied to the row or column of samples across the edge, if and only if:

$$|\delta 0|<10tC \quad (10).$$

If (5) is true, the modified value p'1 in each line across the edge is obtained by $p'1=p1+\Delta p1$ (11). Similarly, if (6) is true, then q'1 in each line across the edge is obtained by $q'1=q1+\Delta q1$ (12) where the offset value $\Delta p1=\text{clip}(-tC/2,tC/2,\delta p1)$ and $\Delta q1=\text{clip}(-tC/2,tC/2,\delta q1)$ with $\delta p1=(((p2+p0+1)>>1)-p1+\Delta 0)>>1$ (13) and $\delta q1=(((q2+q0+1)>>1)-q1-\Delta 0)>>1$ (14). Neglecting the clipping operation, the impulse response of the filter that corresponds to modification of the pixel at position p1 is (8 19 −1 9 −3)/32.

Figure 15:
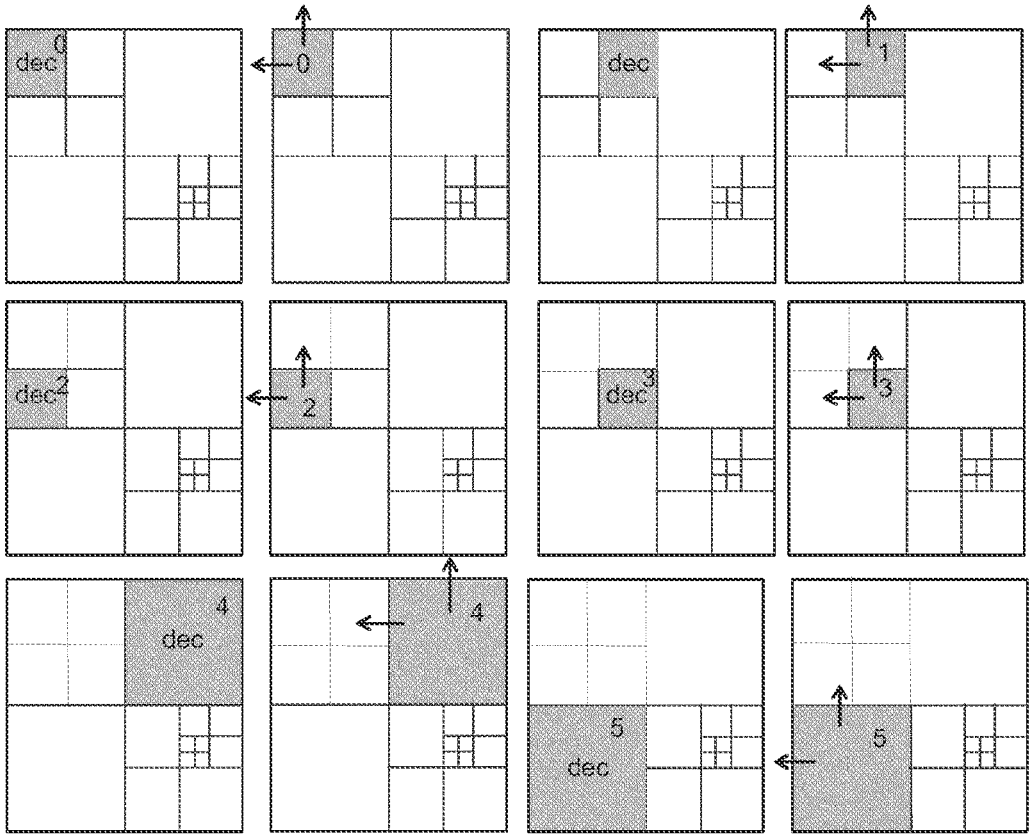
FIG. 15 depicts a coding tree block divided in transform blocks.

In a variant, whether to apply strong or normal deblocking is decided based on the first and the fourth lines across the edge of four samples represented on FIG. 15. The following expressions using information from lines i=0 and i=3 are evaluated to make a decision between the normal and the strong filtering:

$$|p2,i-2p1,i+p0,i|+|q2,i-2q1,i+q0,i|<\beta/8 \quad (2)$$

$$|p3,i-p0,i|+|q0,i-q3,i|<\beta/8 \quad (3)$$

$$|p0,i-q0,i|<2.5*tC \quad (4)$$

If (2), (3), and (4) are true, the strong filtering is applied to the edge. Otherwise, normal filtering is applied.

Strong Filtering Operations

The strong filter modifies more samples on each side of the edge than the normal mode. The offset values Δ0s, Δ1s, and Δ2s are added to pixels p0, p1, and p2, respectively, after clipping of the following δ0s, δ1s, and δ2s values:

$$\delta 0s=(p2+2p1-6p0+2q0+q1+4)>>3 \quad (15)$$

$$\delta 1s=(p2-3p1+p0+q0+2)>>2 \quad (16)$$

$$\delta 2s=(2p3-5p2+p1+p0+q0+4)>>3. \quad (17)$$

The offset values for modification of pixels q0, q1, and q2 are calculated by exchanging q and pin (15), (16), and (17). Impulse responses of the filters that correspond to modification of pixels p0, p1, and p2 are (1 2 2 2 1)/8, (1 1 1 1)/4, and (2 3 1 1 1)/8, respectively, if the clipping operation is neglected.

Chrome deblocking is only performed when Bs is equal to two. In this case, no further deblocking decisions are done. Only pixels p0 and q0 are modified as in (7) and (8). The deblocking is performed with the Δc value, which is obtained by clipping the following δe offset value: δc=(((q0−p0)>>2)+p1−q1+4)>>3 (18) which corresponds to filtering by the filter with the impulse response of (1 4 4 −1)/8.

At step S140, the receiver decodes a current block by intra prediction from the plurality of filtered reference blocks. As an example, the current block is a block on which the same transform is applied, e.g. a TB. Decoding the current block comprises decoding a residual block from the stream, transforming the residual block using a transform that is the inverse of the one used at encoder side and adding a predictor to the transformed block to obtain the decoded current block. Decoding may further comprise, before the transforming step, inverse quantizing the residual block using a quantization parameter. The predictor is obtained by intra prediction of the current block from the plurality of filtered reference blocks obtained at step S130.

The method ends at step S180.

The prediction and deblocking steps are interleaved. Therefore, the coding efficiency is improved.

Figure 9A:
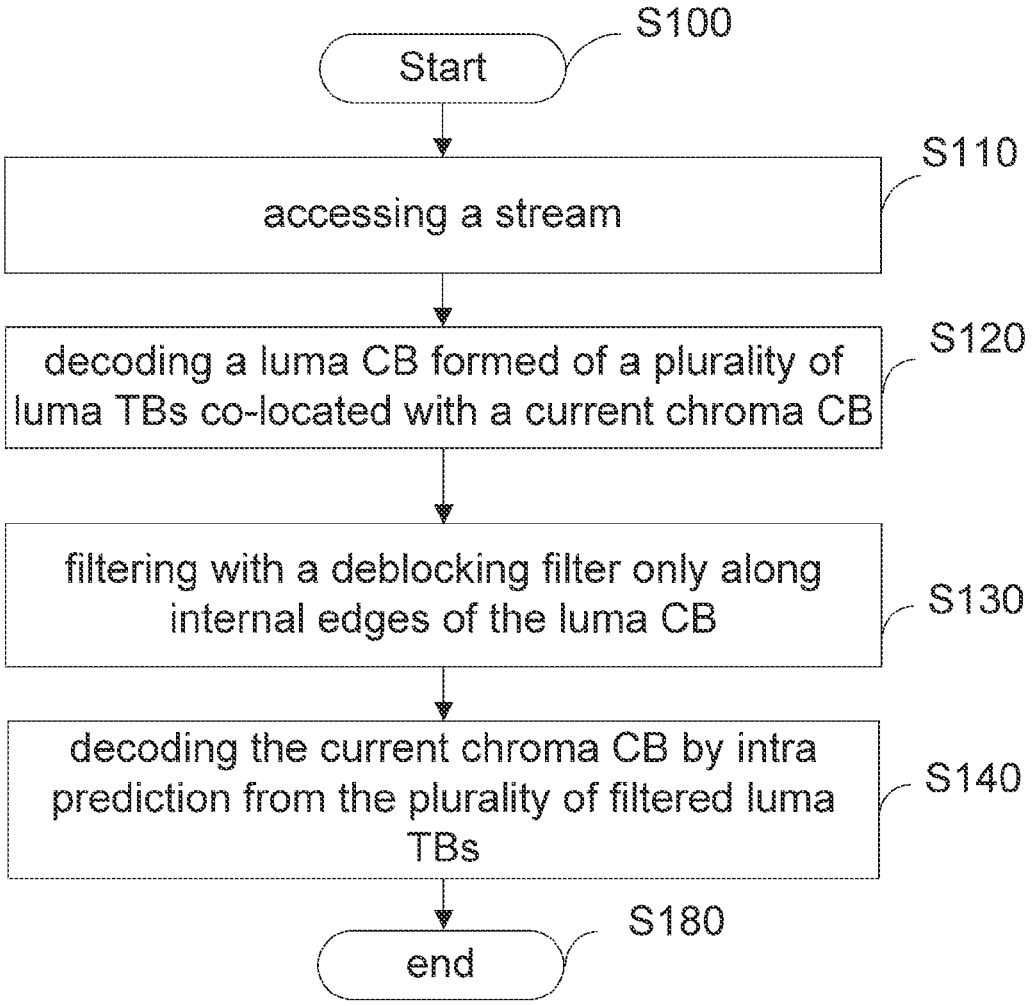
FIGS. 9A, 9B and 9C represent flowcharts of a method for decoding a block of a picture from a stream to obtain a decoded block according to specific and non-limiting embodiments, wherein the block is a chroma block predicted from a plurality of co-located luma blocks (the reference blocks)
Figure 9B:
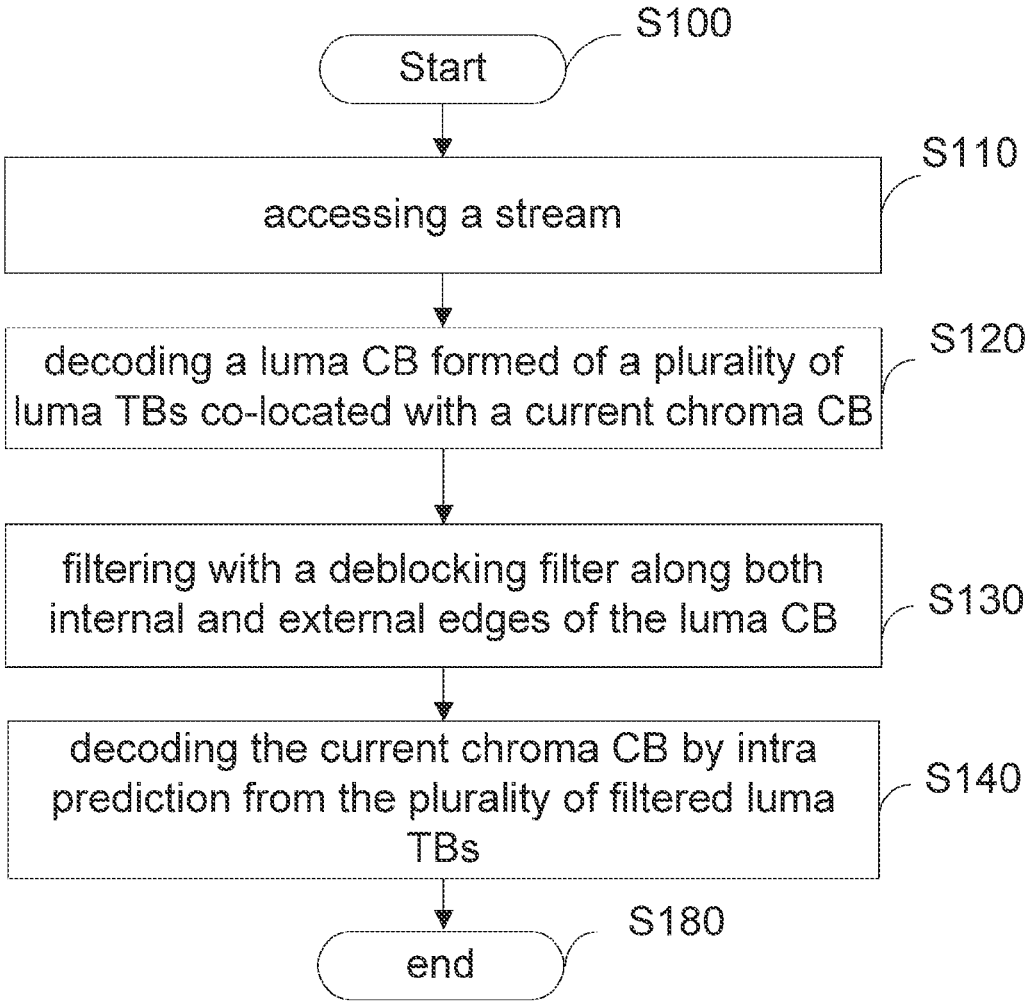
Figure 9C:
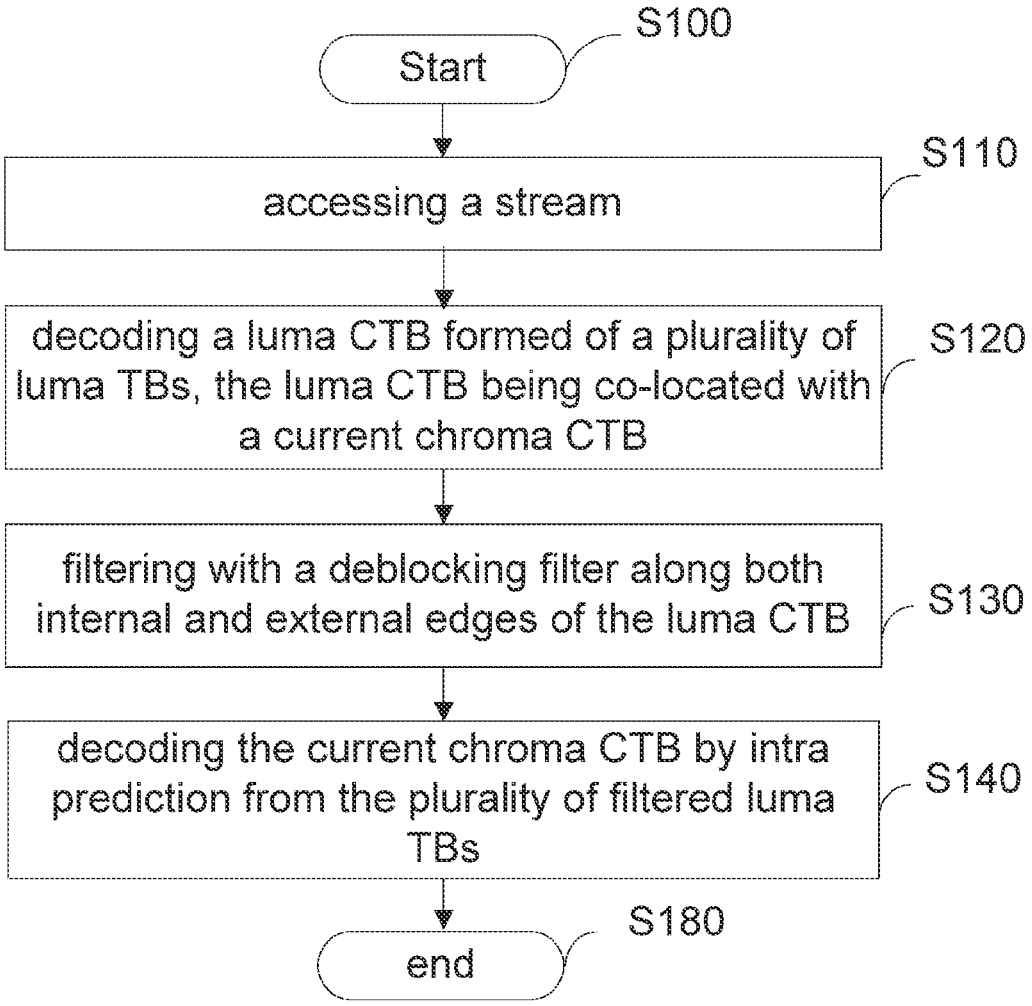

FIGS. 9A, 9B and 9C represent flowcharts of a method for decoding a block of a picture from a stream to obtain a decoded block according to specific and non-limiting embodiments, wherein the block is a chroma block predicted from a plurality of co-located luma blocks (the reference blocks).

The method starts at step S100. At step S110, a receiver accesses a stream. At step S120, the receiver decodes a luma coding block (luma CB) formed of a plurality of luma transform blocks (TBs) from the stream, the luma coding block being co-located with a current chroma coding block. The luma CB is decoded by decoding each of its luma TBs. Decoding a luma TB comprises decoding a residual block from the stream, transforming the residual block using a transform that is the inverse of the one used at encoder side and adding a predictor to the transformed block to obtain the decoded luma TB. Decoding may further comprise, before the transforming step, inverse quantizing the residual block using a quantization parameter. In this embodiment, the reference blocks are the co-located luma TBs.

At step S130, the receiver filters with a deblocking filter only along internal edges of the luma CB decoded at step S120. The internal edges are for example indicated by narrow lines on FIG. 3 while the external edges are indicated by bold lines. The internal edges of the luma CB are formed by the frontiers between the luma TBs. To this aim, the deblocking filter may be the H.265 deblocking filter defined in section 8.7.2 of the document entitled "High Efficiency Video Coding" published in April 2015. It will be appreciated, however, that the present principles also apply to a deblocking filter of the H.264 type or more generally to any deblocking filter. Step 130 generates a filtered version of the co-located luma TBs decoded at step 120 which are only used for inter component prediction.

At step S140, the receiver decodes the current chroma coding block by inter-component intra prediction from the plurality of filtered luma TBs obtained at step S130. Decoding the current chroma CB comprises decoding each of its chroma TBs. Decoding a chroma TB comprises decoding a residual block from the stream, transforming the residual block using a transform that is the inverse of the one used at encoder side and adding a predictor to the transformed block to obtain the decoded current block. Decoding may further comprise, before the transforming step, inverse quantizing the residual block using a quantization parameter. The predictor is obtained from the plurality of filtered luma TBs obtained at step S130 co-located to the chroma CB. In a first optional step, the chroma CB once decoded at step S140 may be further filtered as specified in section 8.7.2 of the HEVC standard. In-loop filterings (e.g. the Sample Adaptive Offset Filtering and/or the Adaptive Loop Filtering) other than the deblocking may also be applied on the decoded chroma CB.

In a second optional step, the luma components of a picture once decoded are further filtered as specified in section 8.7.2 of the HEVC standard to obtain the final decoded luma CB. In-loop filterings (e.g. the Sample Adaptive Offset Filtering and/or the Adaptive Loop Filtering) other than the deblocking may also be applied. It is worth underlining that the deblocking filter of step 130 is an intermediate deblocking filter that is only used for the purpose of the intra prediction of the current chroma coding block. This intermediate deblocking filter may thus behave differently from the classical deblocking filter that is usually applied after all intra predictions have been done.

In a variant of the second optional step, the external edges of the filtered luma CB obtained at step S130 are further filtered as specified in section 8.7.2 of the HEVC standard to obtain the final decoded luma CB.

The method ends at step S180.

In a variant (depicted in FIG. 9B) of the embodiment of FIG. 9A at step S130, the receiver filters with a deblocking filter along both internal and external edges of the luma CB decoded at step S120. Optionally, in-loop filterings (e.g. the Sample Adaptive Offset Filtering and/or the Adaptive Loop Filtering) other than the deblocking may also be applied at step S130 on the luma CB decoded at step S120. The internal edges of the luma CB are formed by the frontiers between the luma TBs. The external edges of the luma CB are edges between the luma CB and other luma CBs already decoded. In this variant, no further deblocking is applied on the luma CB. This variant may also comprise an optional step. In this optional step, the chroma CB once decoded at step S140 may be further filtered as specified in section 8.7.2 of the HEVC standard. In-loop filterings (e.g. the Sample Adaptive Offset Filtering and/or the Adaptive Loop Filtering) other than the deblocking may also be applied on the reconstructed chroma CB.

The methods described with respect to FIGS. 9A and 9B may be repeated to encode each CU of a CTU.

A variant of the embodiment of FIG. 9A is disclosed with respect to FIG. 9C. This variant to intra coded CTU.

The method starts at step S100. At step S110, a receiver accesses a stream. At step S120, the receiver decodes a luma CTB formed of a plurality of luma transform blocks (TBs) from the stream. The luma CTB of the CTU is co-located with a current chroma CTB. The luma CTB is decoded by decoding each of its luma TBs. More precisely, the luma CTB is decoded by decoding each of its luma CBs and each of the luma CB is decoded by decoding each of its luma TBs. Decoding a luma TB comprises decoding a residual block from the stream, transforming the residual block using a transform that is the inverse of the one used at encoder side and adding a predictor to the transformed block to obtain the decoded luma TB. Decoding may further comprise, before the transforming step, inverse quantizing the residual block using a quantization parameter. In this embodiment, the reference blocks are the co-located luma TBs.

At step S130, the receiver filters, with a deblocking filter, the internal and external edges of the luma CTB (i.e. edges of its CBs and TBs) decoded at step S120. The internal edges of the luma CTB are formed by the frontiers between the luma TBs and between the luma CBs. To this aim, the deblocking filter may be the H.265 deblocking filter defined in section 8.7.2 of the document entitled "High Efficiency Video Coding" published in April 2015. It will be appreciated, however, that the present principles also apply to a deblocking filter of the H.264 type or more generally to any deblocking filter. Step 130 generates a filtered version of the co-located luma CTB decoded at step 120 which is used for inter component prediction. In-loop filterings (e.g. the Sample Adaptive Offset Filtering and/or the Adaptive Loop Filtering) other than the deblocking may also be applied on the decoded luma CTB. In a variant, the deblocking filter is applied in step S120 right after a luma CB is decoded, i.e. not after the luma CTB is completely decoded.

At step S140, the receiver decodes the chroma CTB of the CTU by intra prediction from the plurality of filtered luma TBs obtained at step S130. The chroma CTB is decoded by decoding each of its chroma TBs. More precisely, the chroma CTB is decoded by decoding each of its chroma CBs and each of the chroma CB is decoded by decoding each of its chroma TBs. Decoding a chroma TB comprises decoding a residual block from the stream, transforming the residual block using a transform that is the inverse of the one used at encoder side and adding a predictor to the transformed block to obtain the decoded current block. Decoding may further comprise, before the transforming step, inverse quantizing the residual block using a quantization parameter. The predictor is obtained from the plurality of filtered co-located luma TBs obtained at step S130. A deblocking filter and in-loop filterings (e.g. the Sample Adaptive Offset Filtering and/or the Adaptive Loop Filtering) other than the deblocking may also be applied on the decoded chroma CTB.

Figure 10:
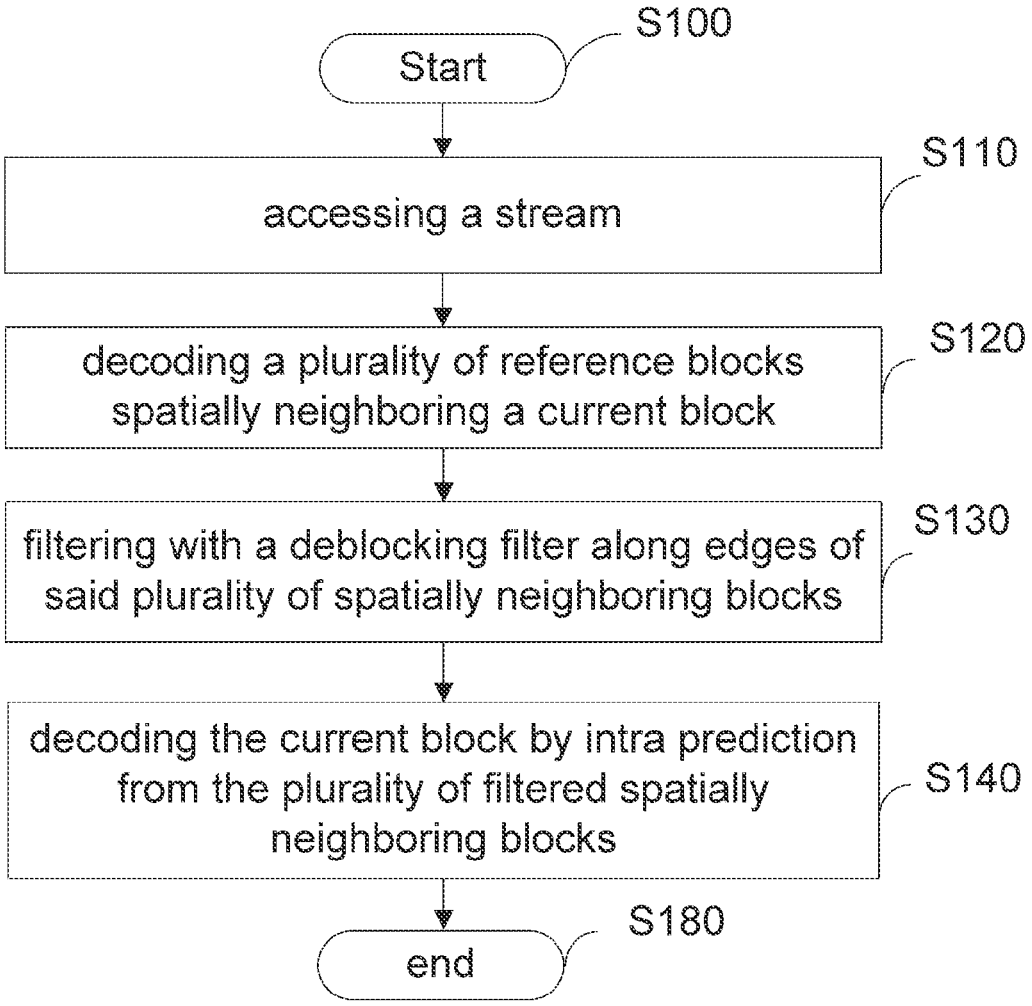
FIG. 10 represents a flowchart of a method for decoding a block of a picture from a stream to obtain a decoded block according to a specific and non-limiting embodiment, wherein the block is a chroma or a luma block predicted from a plurality of spatially neighboring blocks (the reference blocks)

FIG. 10 represents a flowchart of a method for decoding a block of a picture from a stream to obtain a decoded block according to a specific and non-limiting embodiment, wherein the block is a chroma or a luma block predicted from a plurality of spatially neighboring blocks (the reference blocks).

The method starts at step S100. At step S110, a receiver accesses a stream. At step S120, the receiver decodes a plurality of reference blocks (e.g. a plurality of TBs) from the stream. The plurality of reference blocks are spatially neighboring blocks of a current block (e.g. a current TB). Decoding a reference block comprises decoding a residual block from the stream, transforming the residual block using a transform that is the inverse of the one used at encoder side and adding a predictor to the transformed block to obtain the decoded block. Decoding may further comprise, before the transforming step, inverse quantizing the residual block using a quantization parameter.

At step S130, the receiver filters with a deblocking filter along edges of the plurality of spatially neighboring blocks decoded at step S120. To this aim, the deblocking filter may be the H.265 deblocking filter defined in section 8.7.2 of the document entitled "High Efficiency Video Coding" published in April 2015. It will be appreciated, however, that the present principles also apply to a deblocking filter of the H.264 type or more generally to any deblocking filter.

At step S140, the receiver decodes the current block by intra prediction from the plurality of filtered reference blocks. Decoding the current block comprises decoding a residual block from the stream, transforming the residual block using a transform that is the inverse of the one used at encoder side and adding a predictor to the transformed block to obtain the decoded current block. Decoding may further comprise, before the transforming step, inverse quantizing the residual block using a quantization parameter. The predictor is obtained by spatial intra prediction from the plurality of filtered reference blocks obtained at step S130. The method ends at step S180.

In a specific embodiment, wherein a chroma CB or a luma CB is formed of a plurality of TBs, a TB is decoded at step S120 and the decoded TB is filtered at step S130 along its top and left edges. The steps S120 and S130 are repeated for each TB of the CB. In addition, the steps S120 and S130 may also be repeated for each CB of a CTB as depicts on FIG. 15. Therefore, the causal (top and left) spatial blocks, namely the causal TBs, used to predict a current TB have undergone a full deblocking process before they are used for intra prediction of a next TB. On FIG. 15, the first TB (labeled 0) is decoded and then filtered along its top and left edges (as indicated by the arrows). Then, the second TB labeled 1 (in the decoding order) is decoded and filtered along its top and left edges. The process continues until all the TBs are decoded. The filtered edges are represented with doted lines. The de-blocking of each TB is thus performed right after it is decoded, before starting to process a next TB of the considered CTB in decoding order.

The method disclosed with respect to FIGS. 10 and 15 improves the spatial intra prediction which does not suffer from the discontinuities that are present in the reference samples used for intra prediction, when multiple reference TBs are used to spatially predict a single larger TB.

Figure 11:
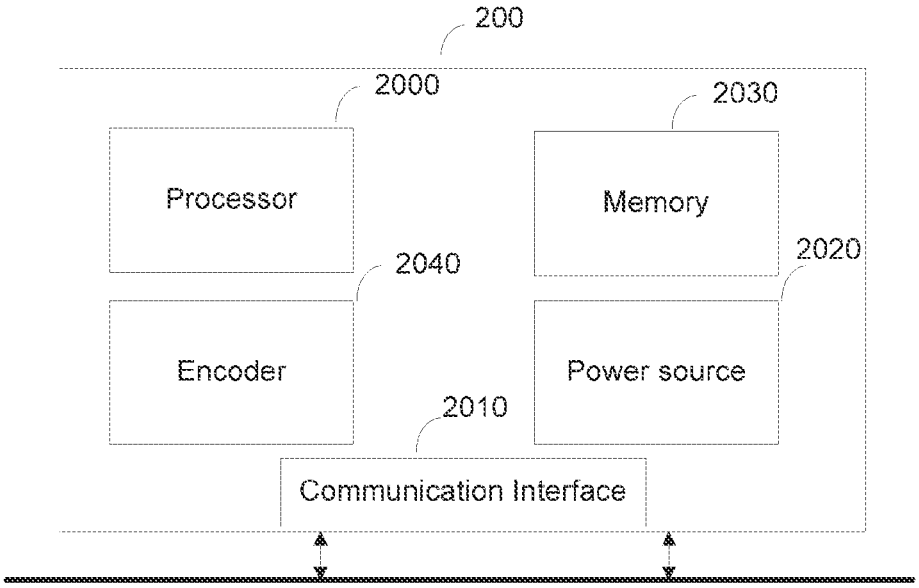
FIG. 11 represents an exemplary architecture of a transmitter configured to code a block of a picture in a stream according to a specific and non-limiting embodiment, wherein the block is intra predicted from a plurality, i.e. at least two, of reference blocks.

FIG. 11 represents an exemplary architecture of a transmitter 100 configured to code a block of a picture in a stream according to a specific and non-limiting embodiment, wherein the block is intra predicted from a plurality, i.e. at least two, of reference blocks.

The transmitter 200 comprises one or more processor(s) 2000, which could comprise, for example, a CPU, a GPU and/or a DSP (English acronym of Digital Signal Processor), along with internal memory 2030 (e.g. RAM, ROM, and/or EPROM). The transmitter 200 comprises one or more communication interface(s) 2010 (e.g. a keyboard, a mouse, a touchpad, a webcam), each adapted to display output information and/or allow a user to enter commands and/or data; and a power source 2020 which may be external to the transmitter 200. The transmitter 200 may also comprise one or more network interface(s) (not shown). Encoder module 2040 represents the module that may be included in a device to perform the coding functions. Additionally, encoder module 2040 may be implemented as a separate element of the transmitter 200 or may be incorporated within processor(s) 2000 as a combination of hardware and software as known to those skilled in the art.

The block may be obtained from a source. According to different embodiments, the source can be, but is not limited to:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the stream may be sent to a destination. As an example, the stream is stored in a remote or in a local memory, e.g. a video memory or a RAM, a hard disk. In a variant, the stream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 200 further comprises a computer program stored in the memory 2030. The computer program comprises instructions which, when executed by the transmitter 200, in particular by the processor 2000, enable the transmitter 200 to execute the encoding method described with reference to FIG. 12. According to a variant, the computer program is stored externally to the transmitter 200 on a non-transitory digital data support, e.g. on an external storage medium such as a HDD, CD-ROM, DVD, a read-only and/or DVD drive and/or a DVD Read/Write drive, all known in the art. The transmitter 200 thus comprises a mechanism to read the computer program. Further, the transmitter 200 could access one or more Universal Serial Bus (USB)-type storage devices (e.g., "memory sticks.") through corresponding USB ports (not shown).

According to exemplary and non-limiting embodiments, the transmitter 200 can be, but is not limited to:

- a mobile device;
- a communication device;
- a game device;
- a tablet (or tablet computer);
- a laptop;
- a still image camera;
- a video camera;
- an encoding chip or encoding device;
- a still image server; and
- a video server (e.g. a broadcast server, a video-on-demand server or a web server).

Figure 12:
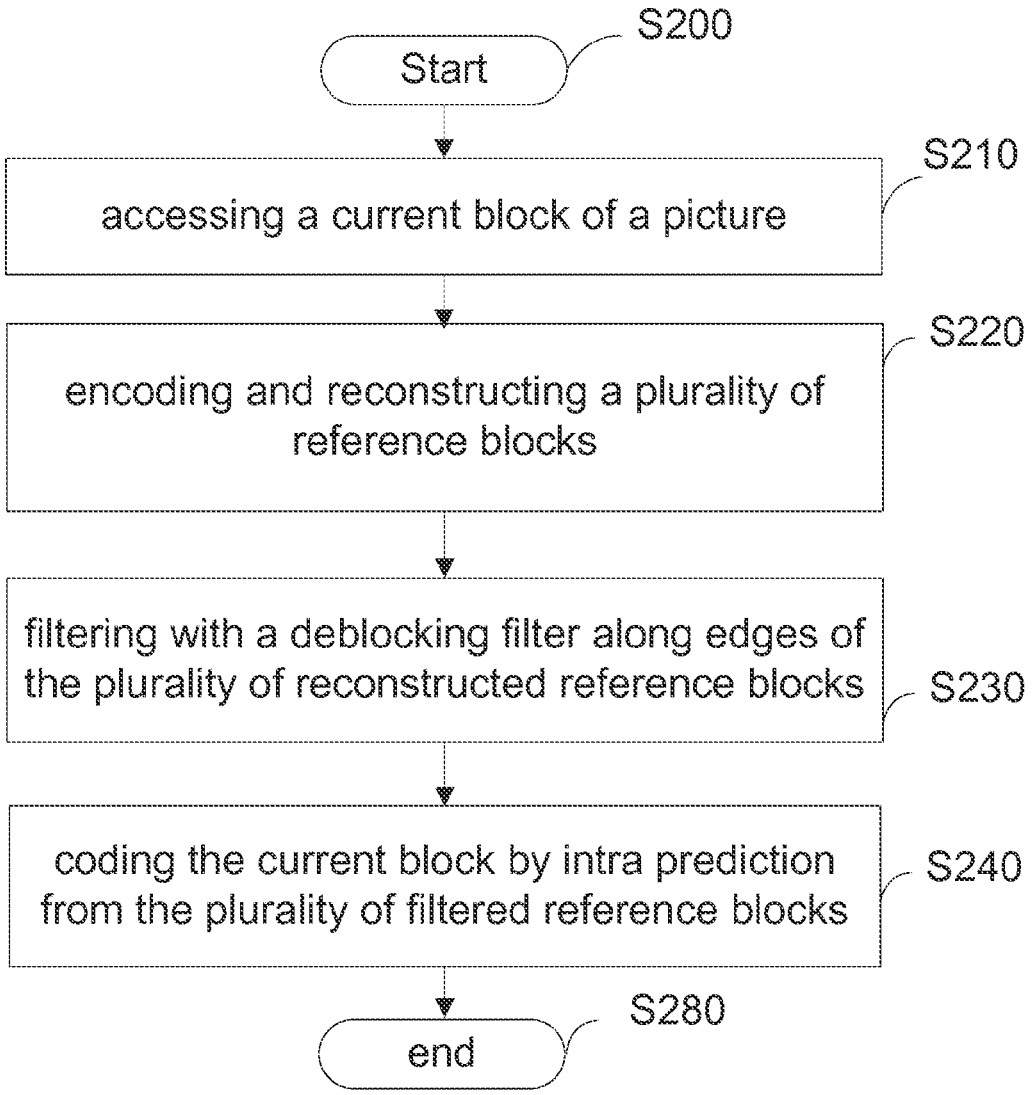
FIG. 12 represents a flowchart of a method for coding a block of a picture in a stream according to a specific and non-limiting embodiment, wherein the block is intra predicted from a plurality, i.e. at least two, of reference blocks.

FIG. 12 represents a flowchart of a method for coding a block of a picture in a stream according to a specific and non-limiting embodiment, wherein the block is intra predicted from a plurality, i.e. at least two, of reference blocks.

The method starts at step S200. At step S210, a transmitter accesses a current block of a picture to be coded. At step S220, the transmitter encodes in the stream and reconstructs a plurality of reference blocks. Encoding a reference block comprises obtaining a residual block by subtracting a predictor from the reference block, transforming the residual block using a transform (inverse of the one used at decoder side) and encoding the transformed block into the stream. Coding may further comprise quantizing the transformed block using a quantization parameter. Reconstructing a reference block after coding comprises transforming the residual block using a transform that is the inverse of the one used for encoding and adding the predictor to the transformed block to obtain the reconstructed block. Reconstructing may further comprise, before the transforming step, inverse quantizing the residual block using a quantization parameter. As an example, each of the reference block is a block on which the same transform is applied, e.g. a TB.

At step S230, the transmitter filters with a deblocking filter along edges of the plurality of reference blocks reconstructed at step S120. To this aim, the deblocking filter may be the H.265 deblocking filter defined in section 8.7.2 of the document entitled "High Efficiency Video Coding" published in April 2015. It will be appreciated, however, that the present principles also apply to a deblocking filter of the H.264 type or more generally to any deblocking filter.

A deblocking filter of the type of the H.265 deblocking filter filters an edge based on quantization parameters associated with regions apart from the edge. Such a deblocking filter makes also use of a boundary strength parameter Bs. According to the present principles, the H.265 deblocking may be adapted to also filter an edge of a reference block before it is used for prediction.

At step S240, the transmitter encodes the current block by intra prediction from the plurality of filtered reference blocks obtained at step S230. As an example, the current block is a block on which the same transform is applied, e.g. a TB. Encoding the current block comprises obtaining a residual block by subtracting a predictor from the block, transforming the residual block using a transform (inverse of the one used at decoder side) and encoding the transformed block into the stream. Coding may further comprise quantizing the transformed block using a quantization parameter.

The method ends at step S280.

All the variants and embodiments disclosed with respect to FIGS. 8, 9A, 9B, 9C and 10 on the decoder side also apply to the encoder side.

The encoding, reconstruction, de-blocking interleaved process can be advantageously used in an encoder Rate Distortion Optimization (RDO) process that selects a set of coding parameters (coding tree, coding modes, PU partitions, prediction modes, transform tree, etc.) associated with a given CTU. Indeed, during the coding tree decision process, the encoder can easily know the impact of the de-blocking filter onto the final distortion associated to the reconstructed signal. Therefore, the RDO process evaluates the distortion associated with each set of coding parameters more accurately and hence is improved.

To take benefit from the interleaved TB-based coding, reconstruction, de-blocking process, the Rate Distortion Optimization can be modified as follows. For each CTU to compress in the considered picture, the following steps are applied:

For each candidate coding tree for current CTU's quad-tree representation
  For each CU candidate in the coding tree representation
  For each candidate PU partitioning and associated prediction modes for current CU
    For each Transform Tree candidate for the transform tree representation of current CU
      For each TU in current candidate Transform Tree
        Predict current TU→pred
        Calculate the residual block for current TU
        Compress the current residual block (Transform, Quantization)
        Entropy encode current residual→rate cost R De-compress current residual (inverse quantize, inverse transform)→res_rec Reconstruct current TU: rec_TU=pred+res_rec De-block the reconstructed TU→rec_rec_dbf Other in-loop post-processing Calculate resulting distortion: $D=\|orig-res_rec_dbf\|^2$ Calculate the rate distortion cost associated to current TU:$RD_{cost}=D+\lambda \cdot R$ where [A] $\lambda$ is the lagrange parameter used in the rate distortion optimization process.

Then the rate distortion cost associated with each TU of a candidate transform tree is added to the RD cost of other TU according to a bottom-to-top RD competition scheme.

One sees that the de-blocking is now integrated inside the rate distortion optimization loop, which makes the Rate Distortion decision aware of how the de-blocking step impacts the final reconstruction blocks.

This makes the overall encoder side rate distortion optimization process more efficient.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A decoding method comprising:

decoding a plurality of reference blocks, *wherein a current block of a picture is a chroma block and wherein the plurality of reference blocks is a plurality of luma blocks co-located with the chroma block, and* wherein a single transform is applied to samples of each reference block[, and wherein edges of the plurality of reference blocks are adjacent to a current block of a picture];

obtaining a plurality of filtered reference blocks by filtering with a deblocking filter along [the] edges [of] *between* the plurality of decoded reference blocks; and decoding the current block by intra prediction from the plurality of filtered reference blocks, wherein a single transform is applied to samples of the current block.

[2. The decoding method of claim 1, wherein the current block is a chroma block and wherein the plurality of reference blocks is a plurality of luma blocks co-located with the chroma block.]

[3. The decoding method of claim 1, wherein the plurality of reference blocks is a plurality of blocks spatially neighboring the current block.]

[4. The decoding method of claim 3, wherein each of the plurality of reference blocks is filtered along a top edge and a left edge after decoding.]

5. An encoding method comprising:

encoding and reconstructing a plurality of reference blocks, *wherein a current block of a picture is a chroma block and wherein the plurality of reference blocks is a plurality of luma blocks co-located with the chroma block, and* wherein a single transform is applied to samples of each reference block[, and wherein edges of the plurality of reference blocks are adjacent to a current block of a picture];

obtaining a plurality of filtered reference blocks by filtering with a deblocking filter along [the] edges [of] *between* the plurality of reconstructed reference blocks; and encoding the current block by intra prediction from the plurality of filtered reference blocks, wherein a single transform is applied to samples of the current block.

[6. The encoding method of claim 5, wherein the current block is a chroma block and wherein the plurality of reference blocks is a plurality of luma blocks co-located with the chroma block.]

[7. The encoding method of claim 5, wherein the plurality of reference blocks is a plurality of blocks spatially neighboring the current block.]

[8. The encoding method of claim 7, wherein each of the plurality of reference blocks is filtered along a top edge and a left edge after reconstruction.]

9. A decoding device comprising one or more processors configured to perform:

decoding a plurality of reference blocks, *wherein a current block of a picture is a chroma block and wherein the plurality of reference blocks is a plurality of luma blocks co-located with the chroma block, and* wherein a single transform is applied to samples of each reference block[, and wherein edges of the plurality of reference blocks are adjacent to a current block of a picture];

obtaining a plurality of filtered reference blocks by filtering with a deblocking filter along [the] edges [of] *between* the plurality of decoded reference blocks; and decoding the current block by intra prediction from the plurality of filtered reference blocks, wherein a single transform is applied to samples of the current block.

[10. The decoding device of claim 9, wherein the current block is a chroma block and wherein the plurality of reference blocks is a plurality of luma blocks co-located with the chroma block.]

[11. The decoding device of claim 9, wherein the plurality of reference blocks is a plurality of blocks spatially neighboring the current block.]

[12. The decoding device of claim 11, wherein each of the plurality of reference blocks is filtered along a top edge and a left edge after decoding.]

13. A*n en*coding device comprising one or more processors configured to perform:

encoding and reconstructing a plurality of reference blocks, *wherein a current block of a picture is a chroma block and wherein the plurality of reference blocks is a plurality of luma blocks co-located with the chroma block, and* wherein a single transform is applied to samples of each reference block[, and wherein edges of the plurality of reference blocks are adjacent to a current block of a picture];

obtaining a plurality of filtered reference blocks by filtering with a deblocking filter along [the] edges [of] *between* the plurality of reconstructed reference blocks; and encoding the current block by intra prediction from the plurality of filtered reference blocks, wherein a single transform is applied to samples of the current block.

[14. The encoding device of claim 13, wherein the current block is a chroma block and wherein the plurality of reference blocks is a plurality of luma blocks co-located with the chroma block.]

[15. The encoding device of claim 13, wherein the plurality of reference blocks is a plurality of blocks spatially neighboring the current block.]

[16. The encoding device of claim 15, wherein each of the plurality of reference blocks is filtered along a top edge and a left edge after reconstruction.]

17. A non-transitory computer-readable medium comprising instructions that cause a processor to perform:

encoding and reconstructing a plurality of reference blocks, *wherein a current block of a picture is a chroma block and wherein the plurality of reference blocks is a plurality of luma blocks co-located with the chroma block, and* wherein a single transform is applied to samples of each reference block[, and wherein edges of the plurality of reference blocks are adjacent to a current block of a picture];

obtaining a plurality of filtered reference blocks by filtering with a deblocking filter along [the] edges [of] *between* the plurality of reconstructed reference blocks; and encoding the current block by intra prediction from the plurality of filtered reference blocks, wherein a single transform is applied to samples of the current block.

*18. The encoding device of claim 13, wherein the plurality of filtered reference blocks is obtained inside a rate distortion optimization loop.*

*19. The encoding method of claim 5, wherein the plurality of filtered reference blocks is obtained inside a rate distortion optimization loop.*

*20. The encoding method of claim 19, wherein a rate distortion decision inside the rate distortion optimization loop utilizes an impact of the deblocking filter on the reconstructed blocks.*

*21. The encoding method of claim 5, wherein the plurality of filtered reference blocks is obtained inside a rate distortion optimization loop, wherein the rate distortion optimization comprises selecting a set of coding parameters associated with the current block.*

*22. The encoding method of claim 5, further comprising storing a deblocked reconstructed current block as a reference block for use in coding a next block.*

*23. A decoding method comprising:*

*decoding a plurality of reference blocks, wherein a current block of a picture is a chroma block, wherein the plurality of reference blocks is a plurality of luma blocks co-located with the chroma block, and wherein a single transform is applied to samples of each reference block;*

*obtaining a plurality of filtered reference blocks by filtering with a deblocking filter along edges between the plurality of decoded reference blocks; and*

*decoding the current block by intra prediction from the plurality of filtered reference blocks.*

*24. The decoding method of claim 23, further comprising storing a deblocked reconstructed current block as a reference block for use in coding a next block.*

* * * * *